(12) United States Patent
Lew et al.

(10) Patent No.: US 9,904,904 B2
(45) Date of Patent: Feb. 27, 2018

(54) DETERMINING TIME HISTORIES FOR FINANCIAL INFORMATION

(75) Inventors: Karl Lew, Sunnyvale, CA (US); Ranjit R. Sawant, Fremont, CA (US); Michael W. Dehlwes, Mountain View, CA (US); Rajasivasubramanian Ramanathan, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 351 days.

(21) Appl. No.: 12/107,577

(22) Filed: Apr. 22, 2008

(65) Prior Publication Data
US 2009/0265261 A1 Oct. 22, 2009

(51) Int. Cl.
| | | |
|---|---|---|
| G06F 15/02 | (2006.01) | |
| G07C 1/10 | (2006.01) | |
| G06F 17/22 | (2006.01) | |
| G07F 19/00 | (2006.01) | |
| G06Q 10/10 | (2012.01) | |
| G06Q 40/02 | (2012.01) | |
| G06Q 40/00 | (2012.01) | |
| G06Q 20/20 | (2012.01) | |
| G06Q 30/04 | (2012.01) | |

(52) U.S. Cl.
CPC ......... *G06Q 10/10* (2013.01); *G06Q 10/1091* (2013.01); *G06Q 20/207* (2013.01); *G06Q 30/04* (2013.01); *G06Q 40/00* (2013.01); *G06Q 40/02* (2013.01); *G06Q 40/10* (2013.01); *G06Q 40/123* (2013.12); *G06Q 40/125* (2013.12)

(58) Field of Classification Search
CPC ........ G06Q 10/10; G06Q 40/02; G06Q 40/10; G06Q 20/207; G06Q 30/04; G06Q 10/1091; G06Q 40/00; G06Q 40/123; G06Q 40/125

USPC ...................................................... 705/32, 31
See application file for complete search history.

(56) References Cited

U.S. PATENT DOCUMENTS

| | | | | |
|---|---|---|---|---|
| 4,231,097 | A * | 10/1980 | Shibayama et al. | 708/290 |
| 4,462,083 | A * | 7/1984 | Schwefel | 702/94 |
| 4,949,287 | A * | 8/1990 | Yamaguchi et al. | 715/246 |
| 5,423,038 | A * | 6/1995 | Davis | 705/12 |
| 5,729,740 | A * | 3/1998 | Tsumura | |
| 5,805,155 | A * | 9/1998 | Allibhoy et al. | 725/115 |
| 6,128,602 | A * | 10/2000 | Northington et al. | 705/35 |
| 6,208,799 | B1 * | 3/2001 | Marsh et al. | 386/292 |
| 6,453,303 | B1 * | 9/2002 | Li | 705/36 R |

(Continued)

OTHER PUBLICATIONS

Online Event Driven matching over Financial data streams by Huanmei Wu: NothEastern University: SIGMOD 2004 Jun. 13-18, 2004.*

(Continued)

*Primary Examiner* — Shay S Glass
(74) *Attorney, Agent, or Firm* — Patterson + Sheridan, LLP

(57) ABSTRACT

Embodiments of a computer system that determines a time history are described. During operation, the computer system receives a single command which accesses information associated with the time history, wherein the command is received from a user, and the information is to be used by financial software. Then, the computer system generates multiple queries corresponding to the time history, where the multiple queries access multiple data sources. Next, the computer system executes the multiple queries to obtain the time history.

26 Claims, 5 Drawing Sheets

(56) References Cited

U.S. PATENT DOCUMENTS

| | | | |
|---|---|---|---|
| 6,944,652 B1* | 9/2005 | Finch et al. | 709/219 |
| 6,978,254 B2* | 12/2005 | Kapp | 705/31 |
| 7,089,200 B2* | 8/2006 | Bode | 705/32 |
| 7,340,422 B2* | 3/2008 | Fisher | 705/30 |
| 7,596,526 B2* | 9/2009 | Blauvelt et al. | 705/37 |
| 7,664,695 B2* | 2/2010 | Cutler | 705/37 |
| 7,742,959 B2* | 6/2010 | Muller | 705/35 |
| 2002/0145944 A1* | 10/2002 | Wright | 368/21 |
| 2002/0188534 A1* | 12/2002 | Brady | 705/32 |
| 2003/0033226 A1* | 2/2003 | Anderson | 705/32 |
| 2003/0055755 A1* | 3/2003 | Shuder et al. | 705/32 |
| 2003/0144932 A1* | 7/2003 | Martin et al. | 705/32 |
| 2004/0122758 A1* | 6/2004 | Wang | 705/35 |
| 2004/0158512 A1* | 8/2004 | Dean et al. | 705/32 |
| 2005/0021428 A1* | 1/2005 | Costello | 705/32 |
| 2005/0177477 A1* | 8/2005 | Arghavanifard et al. | 705/32 |
| 2005/0182701 A1* | 8/2005 | Cheston et al. | 705/32 |
| 2005/0289028 A1* | 12/2005 | Lundberg | 705/32 |
| 2006/0224477 A1* | 10/2006 | Garcia et al. | 705/32 |
| 2006/0265295 A1* | 11/2006 | Feanny | 705/32 |
| 2006/0282354 A1* | 12/2006 | Varghese | 705/32 |
| 2007/0094110 A1* | 4/2007 | McCrea | 705/32 |
| 2007/0124224 A1* | 5/2007 | Ayers et al. | 705/32 |
| 2008/0114683 A1* | 5/2008 | Neveu et al. | 705/50 |
| 2008/0177646 A1* | 7/2008 | Frink | 705/32 |
| 2008/0195512 A1* | 8/2008 | Klebanoff et al. | 705/32 |
| 2008/0243723 A1* | 10/2008 | Voorhees | 705/400 |
| 2008/0319883 A1* | 12/2008 | Delany et al. | 705/32 |
| 2009/0063245 A1* | 3/2009 | Anderson | 705/9 |
| 2009/0070175 A1* | 3/2009 | Bauqhman et al. | 705/8 |
| 2009/0144182 A1* | 6/2009 | Matsuda et al. | 705/32 |
| 2009/0157537 A1* | 6/2009 | Miller | 705/32 |
| 2009/0177692 A1* | 7/2009 | Chagoly et al. | 707/104.1 |
| 2010/0036643 A1* | 2/2010 | Marvasti et al. | 702/189 |
| 2010/0057596 A1* | 3/2010 | Sundel | 705/31 |
| 2010/0070394 A1* | 3/2010 | Wyle | 705/31 |
| 2011/0218894 A1* | 9/2011 | Perkins | 705/31 |
| 2012/0022984 A1* | 1/2012 | Morrison | 705/31 |
| 2012/0072320 A1* | 3/2012 | Kowalski | 705/31 |
| 2012/0117236 A1* | 5/2012 | Fukuda et al. | 709/225 |
| 2012/0197771 A1* | 8/2012 | Wilson et al. | 705/31 |
| 2012/0303403 A1* | 11/2012 | Lee et al. | 705/7.15 |
| 2012/0303495 A1* | 11/2012 | Murray | 705/31 |
| 2013/0013471 A1* | 1/2013 | Fishman | 705/31 |
| 2013/0085913 A1* | 4/2013 | Luongo | 705/31 |
| 2013/0204758 A1* | 8/2013 | Lee et al. | 705/31 |
| 2013/0246234 A1* | 9/2013 | Williams | 705/31 |
| 2013/0262279 A1* | 10/2013 | Finley et al. | 705/31 |
| 2013/0282539 A1* | 10/2013 | Murray | 705/31 |
| 2013/0317957 A1* | 11/2013 | Reahard et al. | 705/31 |
| 2014/0046852 A1* | 2/2014 | Chatelain et al. | 705/50 |
| 2014/0052592 A1* | 2/2014 | Herndon et al. | 705/31 |
| 2014/0074672 A1* | 3/2014 | Sarver | 705/31 |
| 2014/0089151 A1* | 3/2014 | Bumgardner Cirulli et al. | 705/31 |

OTHER PUBLICATIONS

Tuning Time Series Queries in Finance: Case studies: Denniis Shasha: Data Engineering: Jun. 1999 vol. 22 No. 2, pp. 40-46.*
Bohlen, Michael H. et al., Point-Versus Interval-based Temporal Data Models, http://www.cs.aau.dk/~csj/Thesis/pdf/chapter7.pdf, pp. 267-285.

* cited by examiner

DETERMINING TIME HISTORIES FOR FINANCIAL INFORMATION

BACKGROUND

The present invention relates to techniques for determining and revising a time history for financial information to facilitate associated financial calculations.

Financial software, such as payroll software, accounting software, or income-tax software, is used by businesses to satisfy their regulatory and operational requirements. For example, using payroll software companies can generate paychecks for their employees.

Typically, financial software includes one or more data structures in a data layer that includes corporate and employee information, and one or more applications in an application layer which users interact with and which access information from the one or more data structures.

Information that is stored in the one or more data structures can include temporal information, i.e., information that varies over time. For example, an employee's marital status or work location (such as a city or state) can change over time. These changes can impact calculations that are performed using the financial software, such as those that occur when generating a paycheck.

Unfortunately, many existing data structures store information in a field that is overwritten when it is updated, thereby erasing temporal information. To overcome this problem, temporal information may need to be stored in multiple fields or in multiple data structures. Additionally, in order to retrieve temporal information, applications may need to perform multiple accesses, which may involve multiple data sources.

Consequently, in order to perform operations involving temporal information, an application developer requires knowledge about how the one or more data structures are implemented, such as how the information is stored in the one or more data structures, as well as knowledge about the temporal aspects of the information. However, this knowledge may be difficult to obtain. For example, the knowledge is likely to evolve over time as the one or more data sources are changed. Moreover, dealing with such evolving data can increase the expense of developing and updating the application.

SUMMARY

One embodiment of the present invention provides a computer system that determines a time history for financial information. During operation, the computer system receives a single command which accesses information associated with the time history, wherein the command is received from a user, and wherein the information is to be used by financial software. Then, the computer system generates multiple queries to access the time history, where the multiple queries access multiple data sources. Next, the computer system executes the multiple queries to obtain the time history.

In some embodiments, the data sources include: one or more relational databases and/or data sources other than a relational database. For example, the data sources may include one or more files.

In some embodiments, the time history is obtained by combining two types of data that are associated with different data sources and which have different time resolutions. Moreover, the computer system may resample data from at least one of the data sources to have an increased temporal resolution prior to the combining so that the types of data have the same temporal resolution.

In some embodiments, the data sources include temporal data and time-invariant data. For example, the temporal data may include: a residence address for an employee, a work location for an employee, a marital status of an employee, and/or deductions claimed by an employee. Moreover, the temporal data may include information used to determine a payroll tax accrued by a company. Consequently, the temporal data may include income-tax and/or payroll information.

In some embodiments, the multiple data sources include multiple data types. These data types may include data that is aggregated over different time scales. For example, the data may include: today's data, daily data, quarterly data, and/or annual data.

In some embodiments, the financial software includes: accounting software, payroll software, and/or income-tax software.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

Figure 1:
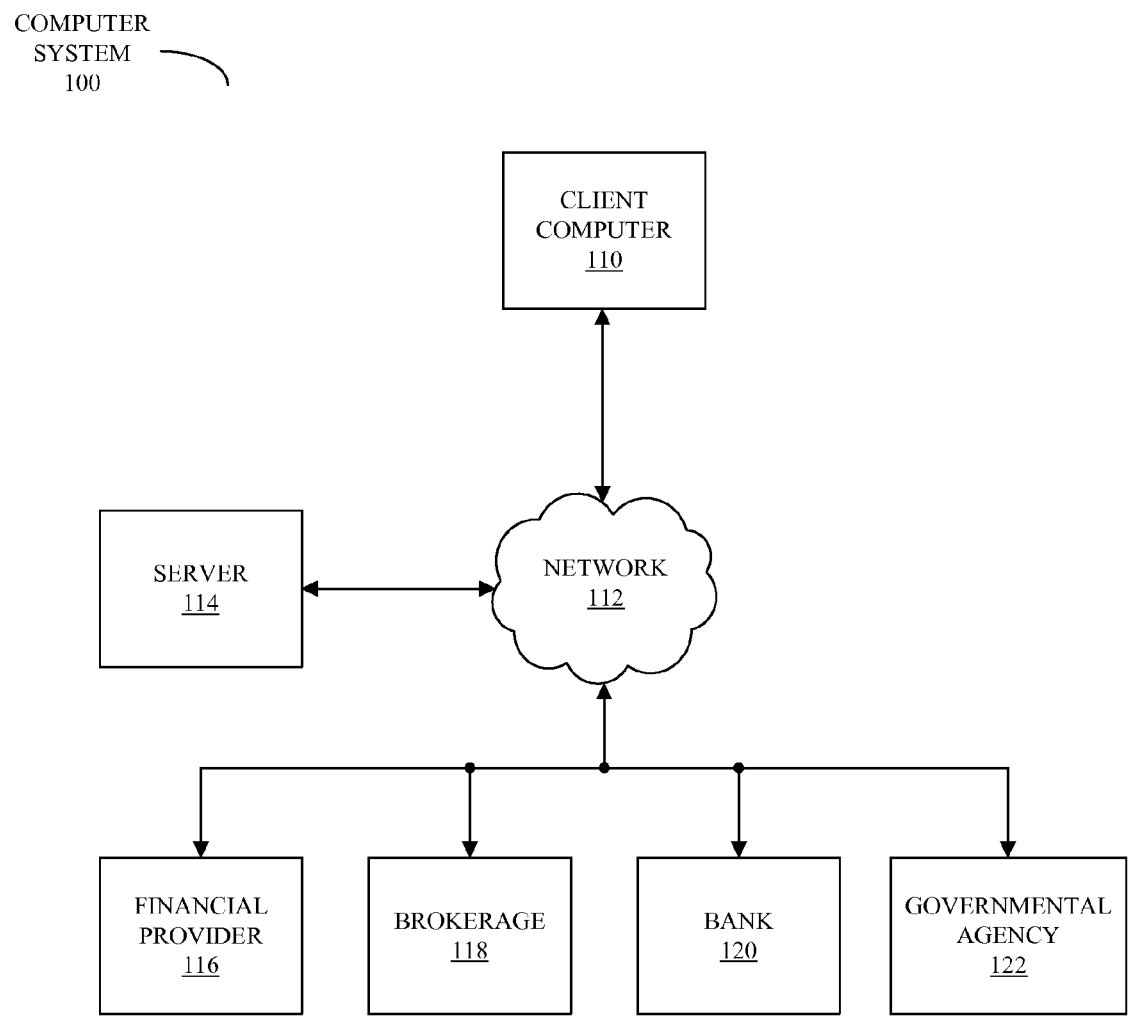
FIG. 1 is a block diagram illustrating a computer system that includes computers and servers that are networked together in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system that determine a time history for financial information are described. These devices and processes may allow applications in an application layer of the software, such as financial software, to access temporal information or data from one or more data sources (such as a database or a data structure) in a transparent manner, for example, without requiring a detailed knowledge of how the one or more data sources are implemented.

In particular, a user may provide a single command for information to an application. For example, the command may explicitly request the information. Alternatively, the request may be implicit, such as a request to determine a paycheck, which may depend on the information. Moreover, this command may be associated (directly or indirectly) with the time history, and the requested information may be used by financial software (for example, to perform a calculation). Note that in the discussion that follows a time history may include a sequence of values for one or more related variables or parameters at different times.

Based on this command, multiple queries corresponding to the time history may be generated and then executed to obtain the time history. (Alternatively, predetermined queries corresponding to the command may be accessed or selected, and then executed.) For example, the queries may be generated in a data layer of the financial software. Moreover, these queries may enable access to multiple data sources which include multiple data types (such as data that is represented in different formats or data that is sampled with a different time resolution), thereby facilitating implicit determination of the time history, and thus, the requested information.

Note that this technique may be implemented as a stand-alone software application, or as a program module or subroutine in another application, such as: financial software, accounting software, payroll software, and/or income-tax software. Furthermore, at least a portion of the software application may be configured to execute on a computer, such as: a personal computer, a laptop computer, a server, a work station, a mainframe computer, a cell phone, PDA, or other device capable of manipulating computer-readable data, or between two or more computing systems over a network (such as: the Internet, World Wide Web or WWW, an intranet, LAN, WAN, MAN, or combination of networks, or other technology enabling communication between computing systems). Therefore, the information in the one or more data structures may be stored locally (for example, on a local computer) and/or remotely (for example, on a computer or server that is accessed via a network).

We now describe embodiments of systems, devices and processes for determining a time history. FIG. 1 presents a block diagram illustrating a computer system 100, including computers and servers that are networked together. In this computer system, one or more users may use financial software, such as accounting software, payroll software and/or income-tax software, to input or collect information and to perform associated calculations. For example, a portion of the financial software, such as one or more data sources and/or computation logic (associated with a particular application that works with the financial software or application module that is included in an application layer of the financial software), may execute on server 114. When needed, another portion of the financial software, such as a user interface and/or additional computation logic associated with the application, may be provided via network 112 (such as the Internet) to client computer 110.

This portion of the financial software may execute on client computer 110 or in the environment of another application on the client computer 110. For example, the portion of the financial software may be provided in one or more web pages. These web pages may execute in a web browser or in the environment of the web browser.

In an exemplary embodiment, a user at client computer 110 is using the financial software. In response to a request from the user, such as a request for a form that includes one or more fields (for example, one or more forms of income-tax or payroll information), one or more web pages may be provided by server 114 to client computer 110.

After receiving the one or more web pages, the user may provide information in the one or more fields in the form. In some embodiments, the user types in the information. However, in some embodiments at least a portion of the information is received from other sources via network 112, such as remotely stored information associated with the user and/or the user's accounts at: financial provider 116, brokerage 118, bank 120, and/or governmental agency 122 (for example, an income-tax agency or an unemployment agency).

In some embodiments, the aggregated information may be stored in one or more data sources for future use, such as to perform calculations (for example, to determine an income-tax withholding and/or a paycheck). Note that the one or more data sources may include: one or more relational databases and/or data sources other than a relational database, such as one or more files. These data sources may be resident on: the client computer 110, server 114, and/or at additional remote locations that can be accessed via network 112.

Moreover, the information may include temporal data and/or time-invariant data. Note that the temporal data may define a time history for one or more parameters or variables that are used by the financial software to perform calculations. Consequently, in some embodiments storage of the information in the one or more data sources includes updating and/or supplementing previously stored information to maintain one or more time histories (which is described further below with reference to FIGS. 4A and 4B).

Using the financial software, the user may perform calculations that are based on the information in the one or more data sources. In particular, the user may provide a single command to a web page on client computer 110. For example, the user may request information that is used to calculate a payroll tax accrued by a company and/or an income-tax payment. This information may include: a residence address for an employee (because income-tax rates vary from city to city and from state to state); a work location for an employee (because payroll and income taxes vary from state to state); a marital status of an employee and/or deductions claimed by an employee (either of which can impact income-tax withholding for the employee). More generally, the information may include income-tax and/or payroll information.

Note that at least some of the requested information may vary over time (for example, the employee may move, may get married or divorced, and/or may become a parent). Consequently, the single command may inherently be associated with one or more time histories. As noted above, existing techniques for accessing such time histories in the one or more data sources may depend on how the requested information is stored, which can increase the complexity and/or expense of the application.

To address this problem, the financial software may generate multiple queries or select predetermined queries that are associated with the one or more time histories. For example, in a data layer in the financial software, which may execute on server 114, the single command may be converted into the multiple queries based on a current configuration of the one or more data sources, including the locations of the one or more data sources and/or how the requested information is stored in the one or more data sources.

When executed, these queries retrieve the information, including the time histories, from the one or more data sources. This retrieved information can then be used by the financial software to perform the calculation (for example, on the server 114 and/or on the client computer 110).

In some embodiments, the requested information includes multiple data types. For example, these data types may include data that is aggregated over different time scales, such as: over a minute, an hour, several hours, a day, a group of days, a week, a month, a quarter, and/or a year.

Moreover, in some embodiments, when processing the queries, a given time history is obtained by combining two types of data that are associated with different data sources and which have different time resolutions. For example, data from at least one of the data sources may be re-sampled to have an increased temporal resolution prior to the combining so that the types of data have the same temporal resolution.

This technique for determining one or more time histories allows developers of applications or application modules for the financial software to retrieve information, including temporal data, using a conceptual definition (such as the single command) without requiring a detailed knowledge of the data sources and how they are implemented (such as a schema for a database). Indeed, the developer of the application may not even need to know that the requested information includes temporal data. Consequently, this technique may facilitate simpler, cheaper and more reliable applications for the financial software.

As noted above, the financial software (including the applications) may be stand-alone software or may be embedded in other software. In one embodiment, the financial software includes software such as: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information. Additionally, in some embodiments the financial software includes software such as: Quicken™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

In some embodiments, at least a portion of the financial software is resident on the computer 110. However, other embodiments may utilize a financial tool that is embedded in a web page (once again, either as stand-alone software or as a portion of other software). This web page may be provided by server 114 via network 112. In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript™ instructions, ECMAScript instructions, VBScript™ instructions, or instructions in another programming language suitable for rendering by a web browser or another client application on the computer 110.

In embodiments where the financial tool is embedded in a web page or executes in an environment on computer 110, information associated with one or more fields in a form may be temporarily stored on the computer 110. Subsequently, this information may be provided to the server 114 via the network 112. Moreover, the information stored on the server 114 may be periodically synchronized with the information stored on the computer 110.

Because the information associated with the form may be sensitive in nature, in some embodiments such information may be encrypted. Additionally, this information may be encrypted when it is communicated over the network 112. For example, communication may utilize a protocol such as HyperText Transfer Protocol Secure (HTTPS).

Note that in some embodiments the computer system 100 includes fewer or additional components. Moreover, two or more components are combined into a single component and/or a position of one or more components may be changed.

Figure 2:
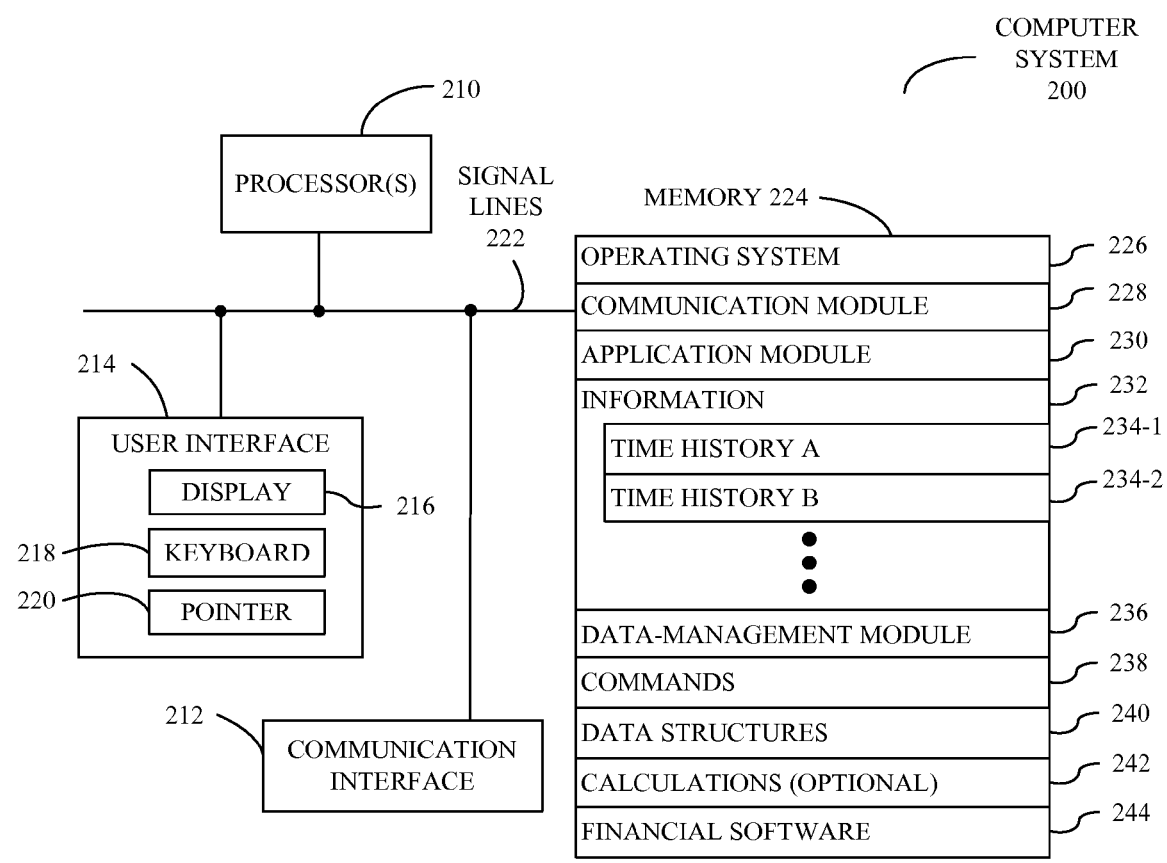
FIG. 2 is a block diagram illustrating a computer system in accordance with an embodiment of the present invention.

FIG. 2 presents a block diagram illustrating a computer system 200. Computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, flash, one or more smart cards, one or more magnetic disc storage devices, and/or one or more optical storage devices. Memory 224 may store an operating system 226 that includes procedures (or a set of instructions) for handling various basic system services for performing hardware-dependent tasks. While not explicitly indicated in the computer system 200, in some embodiments the operating system 226 includes a web browser. Memory 224 may also store procedures (or a set of instructions) in a communication module 228. These communication procedures may be used for communicating with one or more computers and/or servers, including computers and/or servers that are remotely located with respect to the computer system 200.

Memory 224 may also include multiple program modules (or a set of instructions), including application module 230 (or a set of instructions), data-management module 236 (or a set of instructions) and/or financial software 244 (or a set of instructions). Application module 230 may receive commands 238 from a user. Based on a given command, data-management module 236 may access one or more data structures 240 to retrieve information 232, such as time history 234-1 A or time history 234-2 B. Moreover, using this information 232, application module 230 and/or financial software 244 may perform optional calculations 242, such as financial calculations.

Instructions in the various modules in the memory 224 may be implemented in: a high-level procedural language, an object-oriented programming language, and/or in an assembly or machine language. Note that the programming language may be compiled or interpreted, e.g., configurable or configured, to be executed by the one or more processing units 210.

Although the computer system 200 is illustrated as having a number of discrete items, FIG. 2 is a functional description of the various features that may be present in the computer system 200 rather than a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more application-specific integrated circuits (ASICs) and/or one or more digital signal processors (DSPs).

Computer system 200 may include fewer components or additional components. For example, application module 230 and/or data-management module 236 may be included in financial software 244. Moreover, two or more components may be combined into a single component and/or a position of one or more components may be changed. In some embodiments, the functionality of the computer system 200 may be implemented more in hardware and less in software, or less in hardware and more in software, as is known in the art.

Figure 3:
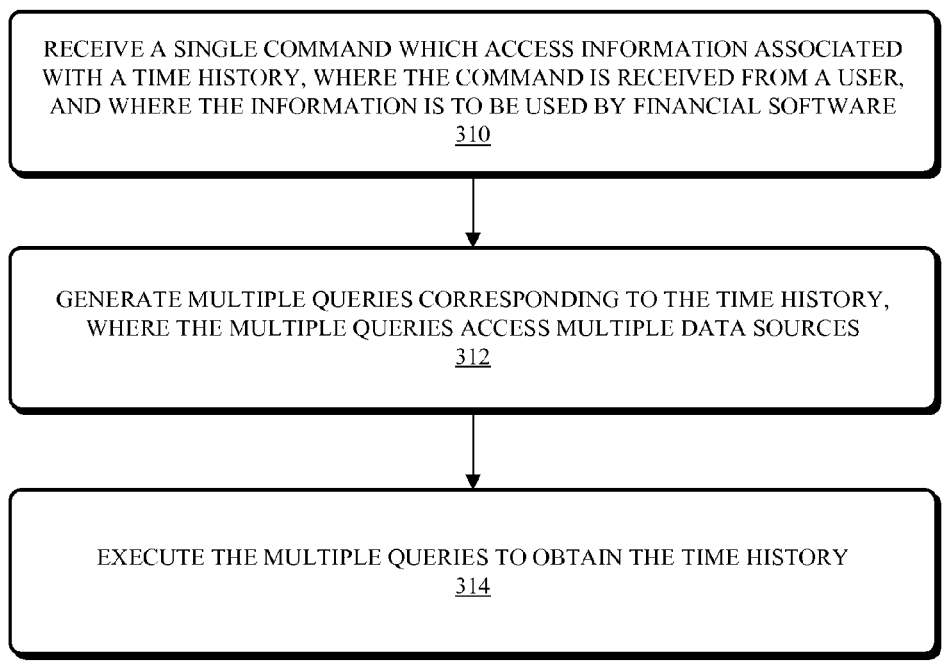
FIG. 3 is a flowchart illustrating a process for determining a time history in accordance with an embodiment of the present invention.

We now discuss methods for determining a time history. FIG. 3 presents a flowchart illustrating a process 300 for determining a time history, which may be performed by a computer system. During operation, the computer system receives a single command which accesses information associated with the time history (310), where the command is received from a user, and where the information is to be used by financial software. Then, the computer system generates multiple queries corresponding to the time history (312), where the multiple queries access multiple data sources. Next, the computer system executes the multiple queries to obtain the time history (314).

In some embodiments of process 300, there may be additional or fewer operations. Moreover, the order of the operations may be changed and/or two or more operations may be combined into a single operation. For example, the information accessed by the multiple queries in operation 314 may be cached in advance for subsequent use. In particular, there may be calculations that are performed routinely, and the information (which may be included in multiple data sources) may be preprocessed or cached.

Figure 4A:
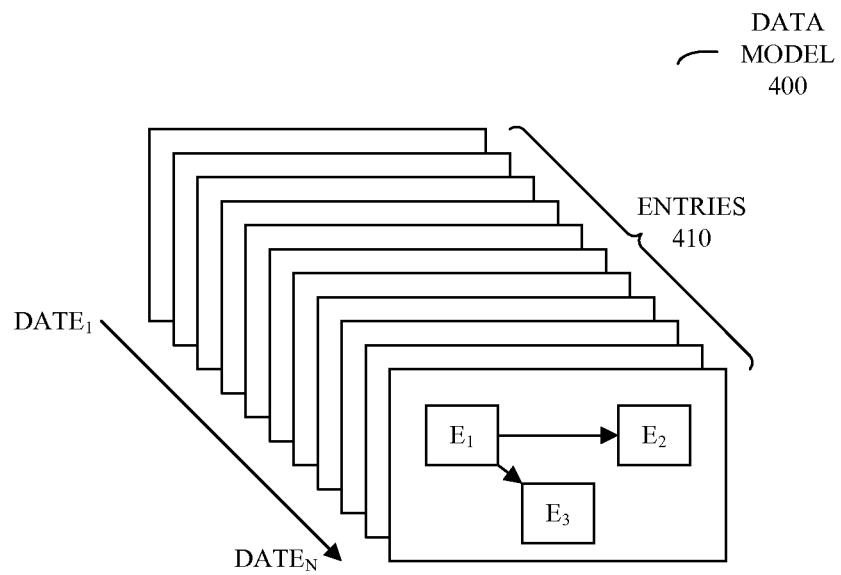
FIG. 4A is a block diagram illustrating a data model in accordance with an embodiment of the present invention.

We now describe exemplary embodiments of determining and/or updating a time history. FIG. 4A presents a block diagram illustrating a data model 400 for information stored in one or more data sources. In particular, this data model includes multiple entries 410 for related variables $E_1$-$E_3$ that can change over time. For example, variable $E_1$ may be a location where an employee lives, variable $E_2$ may be a state unemployment insurance rate, and variable $E_3$ may be a state income-tax rate. During the first portion of a year, the employee may live in California and in a second portion of the year the employee may live in Nevada, which has different values for variables $E_2$ and $E_3$.

Consequently, when determining a payroll tax accrued by a company that employs the employee or an income-tax withholding for the employee, there may be an implicit time dependence, i.e., the information used in these calculations may be based on time histories for the variables $E_1$-$E_3$. As noted previously, accessing the temporal data that is used to determine the time histories, and thus, the information used in the calculations, may be complicated and/or difficult in existing financial software.

Figure 4B:
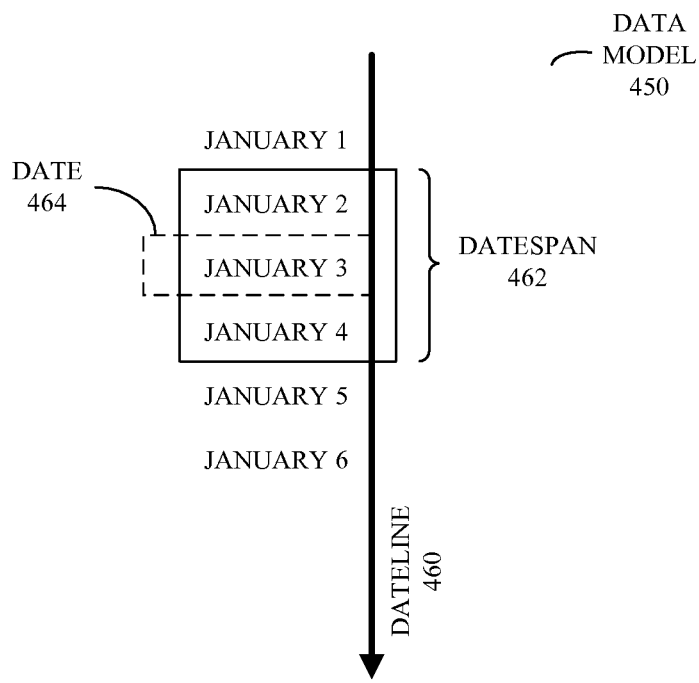
FIG. 4B is a block diagram illustrating a data model in accordance with an embodiment of the present invention.

In some embodiments, this problem is addressed by creating a dateline-based temporal object model (DTOM) in a data layer of the financial software to manage read/write access by an application to a temporal data model, i.e., to the information (which can include temporal data) in one or more data sources. This is shown in FIG. 4B, which presents a block diagram illustrating a data model 450.

Note that temporal access to the DTOM may be managed based on a dateline 460, which may include a sequence of non-overlapping time intervals, such as datespan 462. In some embodiments, a minimum time interval (such as a day) is defined to facilitate a more efficient implementation. Moreover, the dateline may simplify access by the application to the information by separating the temporal aspect of the temporal data model from the data model itself. For example, the application may request information using a single command that is based on a time interval, such as date 464, and dateline 460 may be used to identify the time histories and generate the multiple queries used to retrieve the appropriate information in the one or more data sources. In some embodiments, the dataspan 462 associated with read requests has the minimum time resolution and the dataspan 462 associated with write requests (such as data edits) is an integral multiple of the minimum time resolution.

Note that data model 450 may also be used to update or maintain a historical record of financial data, for example, the one or more time histories. Moreover, note that datespan 462 may also be used to set values for one or more variables for all dates in a range, and that this range can be open ended. For example, an employee may be 'married' as of a given date until further notice. Consequently, the datespan 462 for updating of data can be open-ended. In general, the DTOM handles the time intervals during merges with additional data to maintain the integrity of the temporal data.

Figure 5:
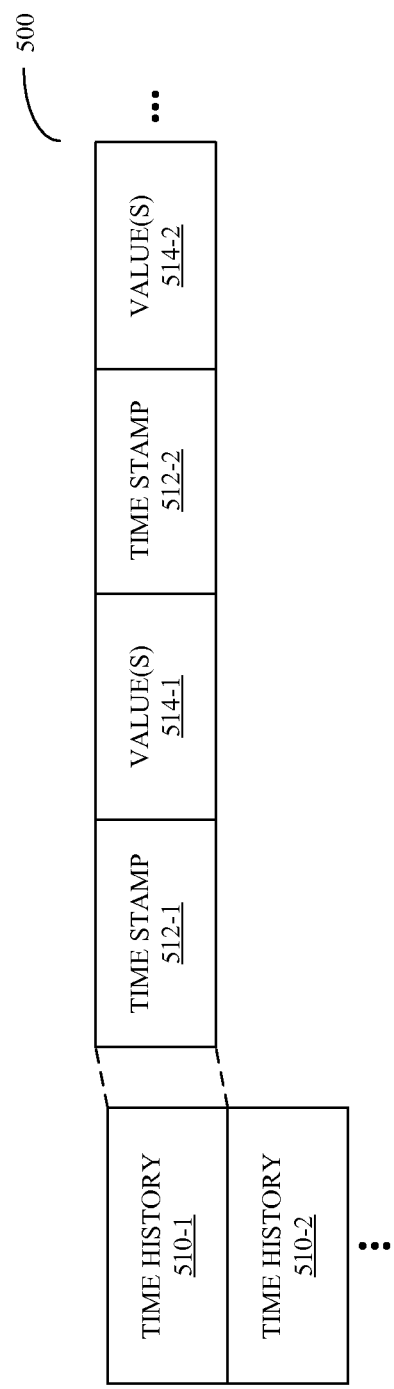
FIG. 5 is a block diagram illustrating a data structure in accordance with an embodiment of the present invention.

We now discuss data structures that may be used in the computer system 100 (FIG. 1) and/or 200 (FIG. 2). FIG. 5 presents a block diagram illustrating a data structure 500. This data structure may include time histories 510 determined from one or more data sources. For example, entries for time history 510-1 may include multiple pairs of time stamps 512 and one or more associated values 514 of variables.

Note that that in some embodiments of the data structure 500 there may be fewer or additional components. Moreover, two or more components may be combined into a single component and/or a position of one or more components may be changed.

While the preceding embodiments have used determination of time histories associated with information used by financial software as an illustrative embodiment, these techniques may be used to determine time histories associated with information used by a wide variety of applications. For example, the ability to determine and/or update one or more time histories may facilitate more flexible benefits for employees, such as allowing employees to adjust their benefits at more than one time during a fiscal year.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for determining values for a financial variable at a specified period of time by creating a dateline-based temporal object model (DTOM) in a data layer of a financial software application, comprising:

receiving, for use by a financial software application at a computer having one or more processors communicatively coupled to a memory, a single command from a user to access values for a first financial variable for a specified date span;

identifying at least one second variable that is associated with the first financial variable;

querying, by the computer, at least one data source out of a plurality of data sources for a time history of the at least one identified second variable during the specified date span;

creating, based on the results of querying the at least one data source, the DTOM comprising a number of sequential non-overlapping time intervals;

converting, by the computer, the received single command into multiple queries based on the non-overlapping time intervals;

executing the multiple queries against the plurality of data sources to obtain values of the first financial variable from the plurality of data sources storing data with different time resolutions in the DTOM, wherein at least one query is destined to a data source storing data related to the first financial variable corresponding to one of the sequential non-overlapping time intervals;

returning results of the multiple queries as results to the single command such that the different time resolutions for the plurality of data sources are transparent to the user;

applying the results of the multiple queries to generate a value for a field in a document; and populating the value to the field of the document.

2. The computer-executable method of claim 1, wherein the data sources include one or more relational databases.

3. The computer-executable method of claim 1, wherein the data sources include data sources other than a relational database.

4. The computer-executable method of claim 1, wherein the data sources include one or more files.

5. The computer-executable method of claim 1, wherein the values of the first financial variable are obtained by combining two types of data that are associated with different data sources from the plurality of data sources and which have different time resolutions.

6. The computer-executable method of claim 5, further comprising resampling data from at least one of the data sources to have an increased temporal resolution prior to the combining so that the types of data have the same temporal resolution.

7. The computer-executable method of claim 1, wherein the data sources include temporal data and time-invariant data.

8. The computer-executable method of claim 7, wherein the temporal data includes: a residence address for an employee, a work location for an employee, a marital status of an employee, or deductions claimed by an employee.

9. The computer-executable method of claim 7, wherein the temporal data includes information used to determine a payroll tax accrued by a company.

10. The computer-executable method of claim 7, wherein the temporal data includes income-tax or payroll information.

11. The computer-executable method of claim 1, wherein the plurality of data sources include multiple data types; and wherein the data types include data that is aggregated over different time scales.

12. The computer-executable method of claim 11, wherein the data includes today's data, daily data, quarterly data or annual data.

13. The computer-executable method of claim 1, wherein the financial software application includes accounting software applications, payroll software applications, or income-tax software applications.

14. A computer-program product for use in conjuction with a computer system for determining values for a financial variable at a specified period of time by creating a dateline-based temporal object model (DTOM) in a data layer of a financial software application, the computer-program product comprising a computer-readable storage medium and a computer-program mechanism embedded therein for configuring the computer system, the computer program mechanism including:

instructions for receiving, for use by a financial software application, a single command from a user to access values for a first financial variable for a specified date span;

instructions for identifying at least one second variable that is associated with the first financial variable;

instructions for querying, by the computer, at least one data source out of a plurality of data sources for a time history of the at least one identified second variable during the specified date span;

instructions for creating, based on the results of querying the at least one data source, the DTOM comprising a number of sequential non-overlapping time intervals;

instructions for converting, by the computer, the received single command into multiple queries based on the non-overlapping time intervals;

instructions for executing the multiple queries against the plurality of data sources to obtain values of the first financial variable from the plurality of data sources storing data with different time resolutions in the DTOM, wherein at least one query is destined to a data source storing data related to the first financial variable corresponding to one of the sequential non-overlapping time intervals; and instructions for returning results of the multiple queries as results to the single command such that the different time resolutions for the multiple plurality of data sources are transparent to the user.

15. The computer-program product of claim 14, wherein the data sources include one or more relational databases.

16. The computer-program product of claim 14, wherein the data sources include data sources other than a relational database.

17. The computer-program product of claim 14, wherein the data sources include one or more files.

18. The computer-program product of claim 14, wherein the values of the first financial variable are obtained by combining two types of data that are associated with different data sources from the plurality of data sources and which have different time resolutions.

19. The computer-program product of claim 18, further comprising resampling data from at least one of the data sources to have an increased temporal resolution prior to the combining so that the types of data have the same temporal resolution.

20. The computer-program product of claim 14, wherein the data sources include temporal data and time-invariant data.

21. The computer-program product of claim 20, wherein the temporal data includes a residence address and a work location for an employee.

22. The computer-program product of claim 20, wherein the temporal data includes income-tax or payroll information.

23. The computer-program product of claim 14, wherein the data types include data that is aggregated over different time scales.

24. The computer-program product of claim 14, wherein the data includes today's data, daily data, quarterly data or annual data.

25. The computer-program product of claim 14, wherein the financial software application includes accounting software applications, payroll software applications, or income-tax software applications.

26. A computer system for determining values for a financial variable at a specified period of time by creating a dateline-based temporal object model (*DTOM*) in a data layer of a financial software application, comprising:
  a processor;
  a memory;
  a program module, wherein the program module is stored in the memory and configured to be executed by the processor, the program module including:
  instructions for receiving, for use by a financial software application, a single command from a user to access values for a first financial variable for a specified date span;
  instructions for identifying at least one second variable that is associated with the first financial variable;
  instructions for querying, by the computer, at least one data source out of a plurality of data sources for a time history of the at least one identified second variable during the specified date span;
  instructions for creating, based on the results of querying the at least one data source, a number of sequential non-overlapping time intervals;
  instructions for converting, by the computer, the received single command to-into multiple queries based on the non-overlapping time intervals;
  instructions for executing the multiple queries against the plurality of data sources to obtain values of the first financial variable from the plurality of data sources storing data with different time resolutions in the DTOM, wherein at least one query is destined to a data source storing data related to the first financial variable corresponding to one of the sequential non-overlapping time intervals; and
  instructions for returning results of the multiple queries as results to the single command such that the different time resolutions for the plurality of data sources are transparent to the user.

* * * * *